United States Patent [19]

Newman, Jr.

[11] 4,046,497

[45] Sept. 6, 1977

[54] CUTTING APPARATUS

[75] Inventor: Ritchey O. Newman, Jr., Midland, Mich.

[73] Assignee: The Dow Chemical Company, Midland, Mich.

[21] Appl. No.: 670,788

[22] Filed: Mar. 26, 1976

Related U.S. Application Data

[63] Continuation of Ser. No. 525,895, Nov. 21, 1974, abandoned.

[51] Int. Cl.² ............................................ B29C 17/14
[52] U.S. Cl. ............................... 425/313; 425/379 S; 83/403; 83/913; 241/60
[58] Field of Search ............... 425/289, 308, 311, 310, 425/312, 313, 382, 464; 83/356.3, 355, 403, 913; 241/60

[56] References Cited

U.S. PATENT DOCUMENTS

| 2,422,480 | 6/1947 | Gordon | 425/311 |
| 3,103,700 | 8/1963 | Halverson et al. | 425/311 |
| 3,295,469 | 1/1967 | Vassalli | 425/313 |
| 3,332,111 | 7/1967 | Hafliger | 425/313 |
| 3,337,913 | 8/1967 | List | 425/313 |
| 3,452,394 | 7/1969 | McNeal | 425/379 |

Primary Examiner—Robert L. Spicer, Jr.
Attorney, Agent, or Firm—R. B. Ingraham

[57] ABSTRACT

An improved cutter for hot plastic strands is provided which uses an inwardly extruding frustoconical die and corresponding frustoncnical cutter rotating within the die. Severed particles are fluid cooled and cutter clearance is readily controlled even when a cutter has been reground for sharpening and the diameter reduced.

2 Claims, 4 Drawing Figures

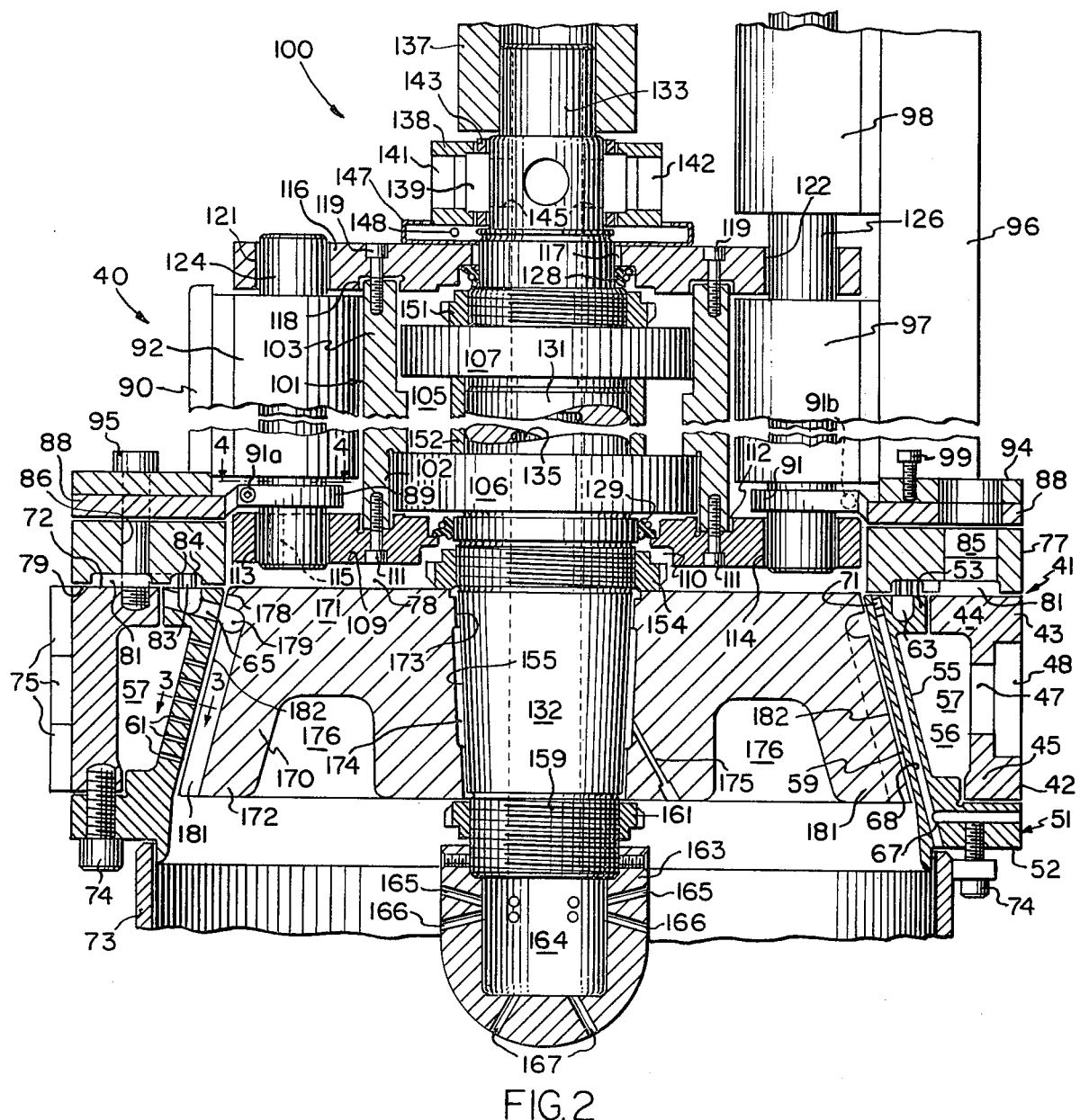
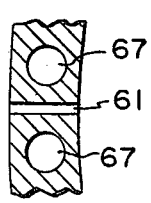
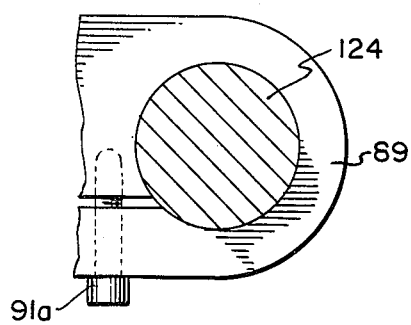
FIG.2
FIG.3
FIG.4

CUTTING APPARATUS

RELATED U.S. APPLICATION

This application is a continuation of our pending application Ser. No. 525,895 filed Nov. 21, 1974 now abandoned.

Many plastic materials are normally provided to a user in the form of granules. In many instances such granules are formed by the extrusion of a plurality of strands and the strands subsequently cut or broken into a plurality of lengths, oftentimes the length of the particle being from about 1½ to 3 times the strand diameter. A wide variety of machines have been provided to accomplish the severing of plastic strands. In some methods strands are extruded, cooled and passed to a rotary impact mill or grinder or the appropriate length of the strand to form the granules is fractured from the major portion of the strand. Other devices employ knives or cutters disposed adjacent a die plate from which the strands are being extruded and sever the extrude without substantial cooling. Such devices are often referred to as "die face cutters." Some such die face cutters operate in air with or without water spray for cooling. Other die face cutters operate immersed in water or other coolant liquid. Centrifugal extruders have been employed to provide granules wherein centrifugally extruded strands are severed by contact with a knife disposed adjacent a rapidly rotating centrifugal die. Other plastic granule preparing devices have made use of a cylindrical die wherein strands are extruded in a generally radially inward direction and a rotating knife or cutter removes the appropriate amount of the freshly extruded strand to form granules. In a die face cutter, particularly the cylindrical inwardly extruded variety, substantial difficulty is often encountered in maintaining the desired clearance between the die face and the cutter blade. Oftentimes a new cutter must be provided when one becomes dull as the normal sharpening process, that is grinding the blade, reduces the diameter and increases the clearance to an unacceptable value. Further, such cutters can present substantial difficulty in centering the cutter within the cylindrical inwardly extruding die. For many plastic materials, oftentimes it is desirable to use cutters of the insert tooth variety or cutters employing brazed on tungsten carbide teeth. When such cutters become dull and need resharpening, it is generally necessary to replace the tungsten carbide inserts.

It would be desirable if there were available an improved apparatus for severing extruded polymer strands into the granules.

It would also be desirable if there were available an improved apparatus for the preparation of polymer composition granules which would permit ready adjustment of the clearance between the cutter and die face.

It would also be desirable if there were available an improved polymer strand severing apparatus of the generally radially inwardly extruding variety which would permit ready centering of the cutter within the die.

These benefits and other advantages in accordance with the present invention are achieved in a polymer severing apparatus which comprises a housing, the housing defining a generally annularly disposed extrusion face, the extrusion face having a plurality of generally radially inwardly extruding extrusion orifices, the housing defining a polymer receiving cavity, the polymer receiving cavity being in communication with the extrusion orifices and the housing defining a polymer supply passage in communication with the polymer receiving cavity, the polymer supply passage being adapted to be in communication with a source of heat plastified synthetic resin polymer, a cutter having a generally circular configuration and being rotatably mounted and disposed within the housing, the cutter having at least a cutting blade adapted to pass by the extrusion orifices of the housing and sever strands which may emerge from the extrusion orifices, the improvement which comprises the extrusion orifices being disposed in a generally frustoconical surface defined by the housing, the cutter having a generally corresponding frustoconical configuration, the cutter having an end of larger diameter and an end of smaller diameter, and beneficially the cutter having at least one locating surface disposed at the smaller end thereof and adapted to engage adjacent generally like frustoconical surfaces of the housing, the locating surface on projection toward the larger end of the cutter encircling but not contacting terminal portions of the cutting blade.

The apparatus of the present invention is employed with benefit with any thermoplastic extrudable material which is severable into granules. The apparatus is used with particular benefit on synthetic resinous thermoplastic compositions particularly those containing abrasive inorganic fillers. It is also useful with natural resins, pitch, tar, bitumen and the like. The operating temperatures and conditions employing the apparatus of the present invention are generally commensurate with those used with cutting apparatus of the prior art.

Further features and advantages of the present invention will become more apparent from the specification taken in connection with the drawing wherein:

FIG. 2 is a detailed fractional sectional view of one embodiment of the invention.

FIG. 3 is a fractional sectional view taken along the line 3—3 of FIG. 2.

FIG. 4 is a fractional sectional view taken along the line 4—4 of FIG. 2.

Figure 1:
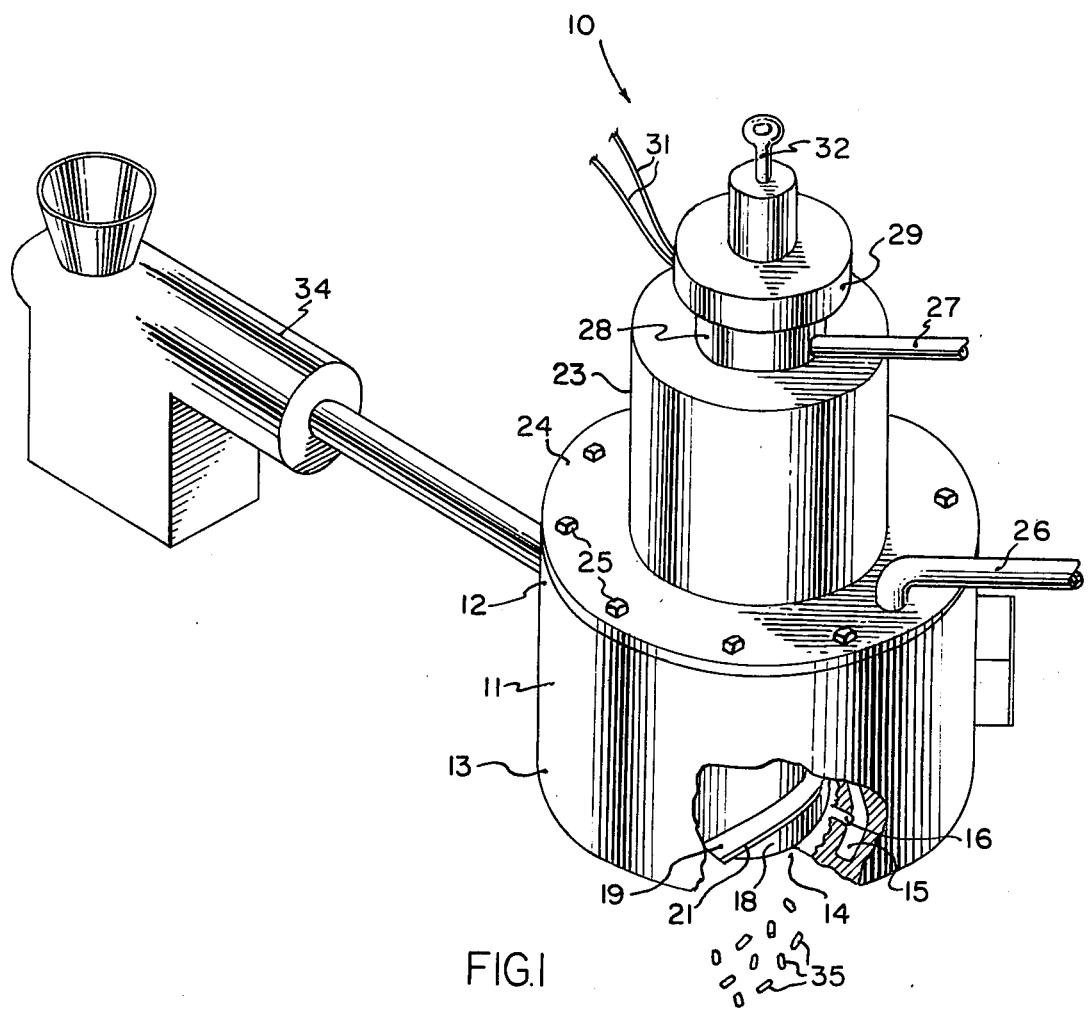
FIG. 1 is a schematic partly in-section view of an apparatus in accordance with the invention.

In FIG. 1 there is schematically depicted an apparatus in accordance with the present invention generally designated by the reference numeral 10. The apparatus 10 comprises a housing 11, the housing 11 is of generally cylindrical configuration and has a first end 12 and a second end 13. The housing 11 defines a generally centrally disposed cavity 14, a polymer receiving cavity 15 and a polymer receiving passage not shown. The polymer receiving passage is in full communication with the polymer receiving cavity 15. A plurality of extrusion orifices 16 are defined by the housing 11 and provide communication between the cavity 15 and the cavity 14. The passages 16 extend in a generally radially inward direction. A cutter 18 is disposed within the cavity 14. The cutter 18 defines at least one blade 19 having a generally helical configuration. The blade 19 has a cutting edge 21 which is adapted to pass by a surface defining the cavity 14 and cut material extruded from the extrusion passageway 16. The cutter 18 is rotatably supported within the cavity 14 by a quill assembly 23. The quill assembly 23 is rigidly affixed to a support member 24. The support member 24 is adjustably positioned on the second end 12 of the housing 11 by means of a plurality of bolts 25. A conduit or cooling fluid source 26 is in operative communication with the housing 11 by means not shown. A second cooling fluid source 27 is in operative communication with a rotary joint 28 which in turn communicates with a hollow shaft not shown supporting the rotor or cutter 18. A motor or rotating means 29 is affixed to the shaft (not shown). The motor 29 is in communication with the power source 31. A positioning means or eye bolt 32 is affixed to the assembly 10 to aid in positioning of the quill assembly 23 and associated parts. A source 34 of a heat plastified composition such as a synthetic resinous extrudable thermoplastic composition is in communication with the cavity 15 by means of supply passage not shown. A plurality of granules 35 are shown being discharged from the assembly 10.

In operation of the apparatus as designated in FIG. 1, the rotor 18, of generally frustoconical configuration, is rotated within the cavity 14 which has a generally similar internal configuration to the rotor in a direction which causes the helical blade to force material downwardly toward the larger end 13 of the housing 11. Cooling fluid is supplied through the cooling fluid sources 26 and 27. Cooling fluid in the source 26 is directed over the orifices 16 and the rotor 18. The cooling fluid from the source 27 passes through the shaft supporting the rotor and is contracted with the granules issuing from the cavity 14.

In FIG. 2 there is depicted a schematic sectional cutaway view of a cutting assembly in accordance with the present invention generally designated by the reference numeral 40. The assembly 40 comprises in cooperative combination a generally annular housing 41. The housing 41 comprises a generally annular outer body section 42. The body section 42 defines a generally cylindrical outer surface 43, a first or smaller end 44 and a second or larger end 45. The body section 42 defines a generally inwardly facing annular groove 47. A polymer receiving passage 48 is generally radially extending and provides communication between the outer surface 43 and annular recess 47. A die member 51 is generally contained within the outer body section 42. The die member 51 has a first or larger end 52 and a second or smaller end 53. The die member 51 has a generally annular frustoconical configuration and has an exterior stepped surface 55 which defines a generally annular outwardly facing groove 56. The grooves 56 and 47 are in facing relationship and define a material receiving cavity 57. The face 55 adjacent the first end 52 and the second end 53 is in sealing engagement with the outer body section 42. The die member 51 defines a generally frustoconical surface 59 which extends generally from the first end 52 to the second end 53. Within the die member 51 are defined a plurality of extrusion orifices 61. The orifices 61 provide communication between the material receiving cavity 57 and the space immediately external to the surface 59. The passageways 61 extend in a generally radially inward direction. The die member 51 defines a generally annular coolant passageway 63 disposed at the second end 53 and remote from the surface 59. A plurality of coolant passages 65 are defined by the die member 51. The passages 65 extend in a generally radially inward direction and terminate on the face 59 of the die member 51 at a location between the extrusion passages 61 and the second or smaller end 53. A plurality of heat exchange passages 67 are disposed within the die member 51 and extend in a generally axial direction. Only one of the passageways 67 is shown. The passageways 67 are generally circumferentially disposed about the surface 59 and are positioned radially outwardly therefrom. Heating means 68 such as a cartridge heater is disposed within the passageway 67. Electrical leads which terminate at an appropriate power source not shown extend external to the die member 51 from the passageway 67. A plug 71 is disposed within the passageway 67 generally adjacent the second end 53 of the die member 51. The die member 51 and outer body section 42 define a generally planar surface 72 adjacent the first end 44 of the outer body section 42 and the second end 53 of the die member 51. The die member 51 is maintained in generally fixed sealing relationship with the outer body section 42 by means of a plurality of circumferentially disposed capscrews 74. Only one of the capscrews is shown. A generally annular shield 73 is affixed to the second end 52 of the die member 51 by means of a plurality of capscrews 74, only one shown. A plurality of band heaters 75, beneficially electrically energized, surround a major portion of the outer body section 42. A base ring 77 of generally planar annular configuration is disposed adjacent the surface 72 defined by the outer body section and the die member 51. The base ring 77 defines an internal generally cylindrical cavity 78 having a diameter slightly greater than the minimum diameter of the die member 51. The outer diameter of the base ring 77 roughly coincides with the major diameter of the outer body section 42. The base ring 77 has a first space 79 disposed adjacent the outer body section 42 and the die member 51. The surface 79 defines a first annular cavity 81 and a second annular cavity 83. The annular cavities 81 and 83 are generally concentric and coaxially disposed. The base ring 77 defined a plurality of annularly disposed fins or flow directors 84 which are generally radially oriented and extend between the cavities 81 and 83. The cavity 83 is in full communication with the annular coolant passage 63 of the die member 52. Spaces defined between the flow directors or fins 84 provide full communication between the cavities 81 and 83. The cavity 81 is in operative communication with at least one passageway 85 which in turn is in communication with a source of cooling fluid such as the source 26 of FIG. 1. The base ring 77 defines a plurality of generally circumferentially disposed bolt openings 86 extending generally axially therethrough. The surface 79 is in sealing engagement with the surface 72 generally adjacent the radially innermost and outermost portions of the base ring 77. A clamp means or stop ring 88 is disposed adjacent the base ring 77 and remote from the outer body section 42. The clamp ring 88 is an annulus generally similar in major dimension to the base ring 77 and includes generally radially inwardly extending clamp members 89 and 91. The clamp members 89 and 91 are adapted to engage generally cylindrical shafts and prevent movement thereof in a direction normal to the plane of the clamp ring 88. The clamp members 89 and 91 have clamp actuating means or capscrews 91a and 91b respectively. Immediately adjacent the clamp ring 88 is disposed a first spindle support bracket 90. The bracket 90 is of general L-shaped configuration and is affixed to the outer body section 42 by means of a plurality of die or clamping bolts 95. The spindle support bracket 90 has affixed thereto a way or guide means 92 beneficially a ball bushing having the axis of movement generally parallel to the axis of the surface 59 of the die member 51. A second bracket 94 is similarly affixed adjacent the clamp ring 88 to the outer body section 42 by means of capscrews similarly disposed to the capscrews 95 not shown. The bracket 94 has a generally axially extending leg 96 extending in a direction parallel to the axis of the guide means 92. Affixed to the leg 96 is a first way or ball bushing 97 and a second way or ball bushing 98. The ball bushings 98 and 97 are coaxially arranged with respect to each other and to the clamp member 91. Similarly, the ball bushing 92 is coaxially disposed relative to the opening of the clamp member 89. Within the bracket 94 is threadably disposed a jacking or positioning screw 99 whose point bears against the clamp ring 88. A plurality of such screws are disposed about the brackets 90 and 94 to permit positioning of the brackets 90 and 94 relative to axis of the surface 59. Advantageously the brackets 90 and 94 are fixed on a ring base in a manner similar to the clamp ring 88. A spindle assembly 100 is disposed coaxially with respect to the surface 59. The spindle assembly 100 comprises a quill 101 corresponding to the quill 23 of FIG. 1. The quill assembly 101 has a first end 102 and a second end 103. The first end 102 is disposed generally adjacent the outer body section 42 and the second end 103 remote therefrom. The quill assembly 101 is coaxially positioned relative to the surface 59 of the die member 51. The quill assembly 101 defines an internal cavity 105. A first bearing member 106 is disposed within the cavity 105 adjacent the end 102. A second bearing member 107 is disposed within the cavity 105 adjacent to the second end 103. The quill assembly 101 has a first quill plate 109 disposed generally adjacent the base ring 77. The first quill plate 109 has a generally annular configuration which is generally co-planar the base ring 77. The quill plate 109 defines a generally centrally disposed opening 110 and is affixed to the quill assembly 101 by means of a plurality of capscrews 111. The quill assembly rests in an annular recess 112 defined by the quill plate 109 and is a press fit therefore. The quill plate defines a first quide shaft receiving opening 113 and a second guide shaft opening 114. The quill plate 109 also defines an indicator opening 115 extending generally parallel to quide opening 113. The guide shaft openings 113 and 114 are generally diametrically disposed and have axes extending perpendicular to the plane of the quill plate 109. A second quill plate 116 is remotely disposed from the first quill section 42. The quill plate 116 is of generally similar construction to the quill plate 109 and defines a central opening 117, a quill receiving annular groove 118, the quill plate 116 is affixed to the second end of the quill 101 by means of a plurality of capscrews 119. The quill assembly 101 is a locational interference fit for the annular groove 118. The second quill plate 116 defines a first guide shaft opening 121 and a second guide shaft opening 122. The guide shaft openings 121 and 122 are generally coaxially disposed relative to the openings 113 and 114 of the first quill plate 109. A first guide shaft 124 is disposed within the openings 113 of quill plate 109 and guide shaft opening 121 of quill plate 116. The guide shaft is rigidly affixed to both quill plates 109 and 116. In a similar manner, a second guide shaft 126 is affixed in guide shaft openings 114 and 122 of quill plates 109 and 116 respectively. The guide shaft 124 extends a distance which approximates the length of the quill plus quill plates whereas the guide shaft 126 extends away from quill plate 109 and 116 through the ball bushing 98 for a distance sufficient to permit movement of quill plate 116 toward ball bushing 97. Note that in FIG. 2 the quill and guide shafts 124 and 126 have been shortened and illustrate quill plate 116 in an external lowermost position and quill plate 109 is in its uppermost position. Disposed within the opening 117 of quill plate 116 is a generally annular flexible oil seal 128. A single oil seal 129 is similarly disposed within the annular opening 110 of quill plate 109. A shaft 131 is disposed within the openings 110 and 117 of the quill plates 109 and 116. The shaft 131 is coaxially disposed relative to the surface 59 of the die member 51. The shaft 131 has a first end 132 and a second end 133. The shaft 131 defines an internal passage 135 extending from the first end 132 to the second end 133. The second end 133 has disposed thereon a drive coupling 137 which is in operative combination with a rotating means not shown. Immediately adjacent the coupling 137 is a sleeve member 138. The sleeve member 138 is coaxially disposed relative to the shaft 131 and defines an internal annular cavity 139 and first and second generally radially extending openings 141 and 142. The openings 141 and 142 are adapted to communicate with a cooling fluid source not shown. The sleeve member 138 is affixed to a generally annular bearing 143 which rotatably bears on the shaft 131. The shaft 131 defines four generally radially disposed openings 145 which provide full communication with the annular passage 139 and permits cooling fluid during the passages 141 or 142 to communicate with the passageway 135 disposed in the shaft 131. The shaft and sleeve therefore form a rotary joint. Disposed immediately adjacent the sleeve member 138 and remote from the coupling 137 is an annular splash pan 147 adapted to receive leakage from the sleeve member 138 which might pass between the bearing member 143 and the adjacent surfaces of the shaft 131. A drain 148 is defined in the splash pan 147. A first locknut or bearing engaging member 151 threadably engages the shaft 131 at a location adjacent the second quill plate 116 remote from the sleeve 138. The locknut 151 engages an inner race of the bearing 107. A sleeve 152 of cylindrical configuration extends between adjacent surface of the inner races of the bearings 106 and 107. The sleeve 152 is of hollow cylindrical configuration and closely approximates the adjacent diameter of the shaft 131. A second lock or jacking nut 154 is threadably affixed to the shaft 131 at a location adjacent the first quill plate 109 and remote from the second quill plate 116. The first end 132 of the shaft 131 has an outwardly converging tapered surface 155. The surface 155 has a self-locking taper configuration such as Morse, Brown and Sharpe or like tapers. The shaft 131 at the first end 132 most remote from the second end 133 defines a generally cylindrical threaded portion 159. A locknut 161 is disposed upon the threaded portion 159 and most remote from the second end 133, there is threadably disposed thereon a fluid cooling dispersing means or distribution cap 163. The distribution cap 163 has general axial symmetry and defines a generally cylindrical cavity 164 therein. Passageways 165, 166 and 167 respectively provide communication between the cavity 164 and space external to the cap 163. The cavity 164 is in full commmunication with the passage 135 of the shaft 131. The passageways 166 and 167 are generally directed radially outward from the axis of shaft 131. A cutter 170 is disposed on the shaft 131 and within space enclosed by the surface 59 of the die member 51. The cutter 170 is of generally fructoconical configuration and has a first end 171 which is an end of minor diameter and a second end 172 which is an end of major diameter. The cutter 170 defines a centrally disposed passageway 173 having a taper which mates with the surface 155 of the shaft 131 at locations adjacent the ends 171 and 172 to lock the cutter in position. An annular tapered recess 174 is defined between the shaft 131 and the cutter 170. The recess 174 is in communication with passageway 175 which terminates on the second end 172 of the cutter 170. The cutter 170 defines a generally annular cavity 176 which conveniently is employed to reduce the mass of the cutter. The cutter 170 adjacent the first end 171 defines a locating surface 178. The surface 178 has a generally frustoconical configuration having a taper which corresponds to the taper of the adjacent surface 59 of the die member 51 and is of sufficient size to engage the adjacent surface 59. The cutter 170 defines a generally annular groove 179. The groove 179 extends generally about the periphery of the cutter and is positioned adjacent the passages 65 and is adapted to receive cooling fluid therefrom. A plurality of cutter blades 181 are peripherally disposed about the cutter 170 and as depicted in FIG. 2 extend in a generally axial direction. The cutter blades 181 define therebetween a plurality of generally axially extending recesses. Each of the cutter blades 181 terminates in a cutting edge 182. The cutting edges 182 lie in axial planes of a frustum of a cone, the frustum of a cone being contained within a frustum of a cone obtained by the projection of the locating surface 178 toward the second end 172 of the cutter 170.

FIG. 3 is a fractional sectional view of the die member 51 taken along the line 3—3 of FIG. 2. FIG. 3 shows the relationship of extrusion orifices 61 and adjacent heat exchange passageways 67.

In FIG. 4 there is shown the relationship between the clamping means 89 and the first guide shaft 124.

In operation of the apparatus such as is depicted on FIGS. 2, 3, and 4, appropriate heating means such as electrical power is applied to the cartridge heaters 68 until at least the die member 51 has attained a temperature appropriate for the extrusion of thermoplastic material. Thermoplastic material is introduced into the cavity 57 and cooling fluid applied to passageway 85, which flows to the annular recesses 81, 83, into the coolant passage 63 in the die member 51 and is discharged through the passages 65 into the annular groove 179 in the cutter 170 and the fluid directed over the cutter blades 181. The cutter 170 is rotated and the extrude from the openings 61 is sheared by the cutter blade 181 to form a plurality of granules. Appropriate coolant fluid is provided from the openings 141 and 142 through the radial openings 145 and at the shaft 131 to the passage 135 of the shaft 131 and it is then discharged through the openings 165, 166 and 167 of the distribution cap 163. Fluid coolant, from the distribution cap, such as air and/or water, then contacts the severed granules emerging from the spaces between the blades 181 and reduces the temperature below the thermoplastic temperature.

In servicing the apparatus 100 of FIGS. 2, 3 and 4, the spindle assembly 100 may readily be lowered to a location remote from the die member 51 by first supporting the weight of the spindle assembly by an eyebolt such as the eyebolt of FIG. 1, loosening the clamp means 89 and 91, the assembly is then lowered until the second quill plate 116 is adjacent the ball bushings 92 and 97. The cutter 170 and the cavity defined between the surface 59 of the die member 51 can then readily be inspected. If necessary to remove the cutter 170, the distribution cap or member 163 is unscrewed. The weight of the cutter 170 is supported by an appropriate means such as planks. The locknut 161 is removed and the cutter forced from the shaft by appropriate rotation of the jacking nut 154. In the event that sufficient force can not be applied to remove the cutter using the nut 154, oil under pressure is introduced through passageway 175 into the recess 174 and the jacking nut 154 is again forced against the cutter. In the event that it is necessary to sharpen a cutter such as the cutter 170, the cutter is rotatably supported in a suitable grinder, and the cutting edges 182 ground the necessary amount to provide the desired cutting edge configuration. The locating surface 178 is then ground to reduce its radial diameter a like amount. The cutter 170 is then replaced on the shaft 131, the spindle assembly 100 raised until the locating surface 128 engages the corresponding portion of the surface 59 of the die member 51. Clamping means 89 and 91 are locked to locating shafts 124 and 126 and by means of a detailed indicator bearing on the cutter 170 and inserted through opening 115 in quill plate 109. The quill assembly is then lowered the desired amount by means of the screws 95 and 98, that is, by tightening screws 95 and loosening the screws 98 to obtain the desired granules between the blade edges 182 and the fructoconical surface 59 of the die plate. Employing the apparatus as fully hereinbefore described, particulate thermoplastic resinous and other extrudable materials are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrating and is not to be construed or interpreted as being restrictive or otherwise limiting of the present invention, excepting as it is set forth and defined in the hereto-appended claims.

I claim:

1. In a polymer severing apparatus which comprises a housing, the housing defining a generally annularly disposed extrusion face, the extrusion face having a plurality of generally radially inwardly extruding extrusion orifices, the housing defining a polymer receiving cavity, the polymer receiving cavity surrounding the extrusion face, the polymer receiving cavity being in communication with the extrusion orifices and the housing defining a polymer supply passage in communication with the polymer receiving cavity, the polymer supply passage being adapted to be in communication with a source of heat plastified synthetic resin polymer, a cutter having a generally circular configuration and being rotatably mounted and coaxially disposed within a cavity defined by the housing, the cutter having at least a cutting blade adapted to pass by the extrusion orifices of the housing and sever strands which may emerge from the extrusion orifices, the improvement which comprises the extrusion orifices being disposed in a generally frustoconical surface defined by the housing, the cutter having a generally corresponding frustoconical configuration, the cutter having an end of larger diameter and an end of smaller diameter, the cutter having at least one locating surface disposed at the smaller end thereof and adapted to engage adjacent generally like frustoconical surfaces of the housing, the locating surface on projection toward the larger end of the cutter encircling but not contacting terminal portions of the cutting blade, the cutter being rotatably mounted upon a hollow shaft, the shaft having fluid cooling dispersing means positioned on the shaft at a location generally adjacent to the end of the larger diameter of the cutter.

2. In a polymer severing apparatus which comprises a housing, the housing defining a generally annularly disposed extrusion face, the extrusion face having a plurality of generally radially inwardly extruding extrusion orifices, the housing defining a polymer receiving cavity, the polymer receiving cavity surrounding the extrusion face, the polymer receiving cavity being in communication with the extrusion orifices and the housing defining a polymer supply passage in communication with the polymer receiving cavity, the polymer supply passage being adapted to be in communication with a source of heat plastified synthetic resin polymer, a cutter having a generally circular configuration and being rotatably mounted and coaxially disposed within a cavity defined by the housing, the cutter having at least a cutting blade adapted to pass by the extrusion orifices of the housing and sever strands which may emerge from the extrusion orifices, the improvement which comprises the extrusion orifices being disposed in a generally frustoconical surface defined by the housing, the cutter having a generally corresponding frustoconical configuration, the cutter having an end of larger diameter and an end of smaller diameter, the cutter having at least one locating surface disposed at the smaller end thereof and adapted to engage adjacent generally like frustoconical surfaces of the housing, the locating surface on projection toward the larger end of the cutter encircling but not contacting terminal portions of the cutting blade, a mounting means selectively positioning the cutter within the housing, a means to position the cutter comprising at least two guide shafts extending in a direction generally parallel to the axis of rotation of the cutter and slidably positioned within ways mounted on the housing and clamp means to selectively position the cutter assembly on the guide shafts.

* * * * *